United States Patent
Hulsken

(10) Patent No.: US 10,917,663 B2
(45) Date of Patent: Feb. 9, 2021

(54) METHOD AND APPARATUS FOR FAST AND EFFICIENT IMAGE COMPRESSION AND DECOMPRESSION

(71) Applicant: KONINKLIJKE PHILIPS N.V., Eindhoven (NL)

(72) Inventor: Bas Hulsken, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 225 days.

(21) Appl. No.: 15/760,019

(22) PCT Filed: Sep. 9, 2016

(86) PCT No.: PCT/EP2016/071262
§ 371 (c)(1),
(2) Date: Mar. 14, 2018

(87) PCT Pub. No.: WO2017/046005
PCT Pub. Date: Mar. 23, 2017

(65) Prior Publication Data
US 2018/0255321 A1    Sep. 6, 2018

(30) Foreign Application Priority Data
Sep. 18, 2015  (EP) .................... 15185781

(51) Int. Cl.
*G06K 9/36* (2006.01)
*H04N 19/61* (2014.01)
(Continued)

(52) U.S. Cl.
CPC ............. *H04N 19/61* (2014.11); *H04N 19/13* (2014.11); *H04N 19/184* (2014.11);
(Continued)

(58) Field of Classification Search
CPC ...... H04N 19/13; H04N 19/63; H04N 19/647; H04N 19/64; H04N 19/93; H04N 19/34;
(Continued)

(56) References Cited

U.S. PATENT DOCUMENTS

| | | | |
|---|---|---|---|
| 5,881,176 A * | 3/1999 | Keith | ............... G06F 17/148 375/E7.016 |
| 6,195,026 B1 | 2/2001 | Acharya | |

(Continued)

FOREIGN PATENT DOCUMENTS

| | | |
|---|---|---|
| EP | 1250011 A2 | 10/2002 |
| EP | 1333679 B1 | 8/2003 |

(Continued)

OTHER PUBLICATIONS

Tsai, M.J. et al "Stack-Run Image Coding", IEEE Transactions on Circuits and Systems for Video Technology, Express Letters, vol. 6, No. 5. Oct. 1996. pp. 519-521.

(Continued)

*Primary Examiner* — Li Liu
(74) *Attorney, Agent, or Firm* — Sherry Austin

(57) ABSTRACT

The invention relates to a method and apparatus for fast and efficient image compression and decompression comprising transform coding of image data to generate an image representation using transform coefficients, bit-plane serialization of the image representation using transform coefficients, and for each bitplane optimal prefix encoding of bits in a bitplane sharing local context, run-length encoding of 0 bit sequences in the bitplane and storing the coefficients received after optimal prefix encoding and 0 run length encoding starting with the sign followed by the bits in the order of significance, starting with the most significant bit to the least significant bit in a seektable in a header section.

9 Claims, 2 Drawing Sheets

(51) Int. Cl.
*H04N 19/184* (2014.01)
*H04N 19/13* (2014.01)
*H04N 19/34* (2014.01)
*H04N 19/63* (2014.01)
*H04N 19/64* (2014.01)
*H04N 19/93* (2014.01)

(52) U.S. Cl.
CPC ............ *H04N 19/34* (2014.11); *H04N 19/63* (2014.11); *H04N 19/647* (2014.11); *H04N 19/93* (2014.11)

(58) Field of Classification Search
CPC ...... H04N 19/36; H04N 19/60; H04N 19/645; H04N 19/98; H04N 19/184; H04N 19/1883
See application file for complete search history.

(56) References Cited

U.S. PATENT DOCUMENTS

| | | | |
|---|---|---|---|
| 6,229,927 B1 | 5/2001 | Schwartz | |
| 6,263,109 B1 | 7/2001 | Ordentlich | |
| 6,272,180 B1 | 8/2001 | Lei | |
| 6,879,726 B2 | 4/2005 | Sato | |
| 6,980,597 B1 | 12/2005 | Ling | |
| 7,492,955 B2 | 2/2009 | Zandi | |
| 2003/0068091 A1* | 4/2003 | Schwartz | H04N 19/63 382/246 |
| 2009/0324116 A1 | 12/2009 | Takada | |
| 2016/0119651 A1* | 4/2016 | Eslami | H04N 19/122 382/245 |
| 2018/0041777 A1* | 2/2018 | Rissa | H04N 19/647 |
| 2018/0205962 A1* | 7/2018 | Rissa | H04N 19/436 |

FOREIGN PATENT DOCUMENTS

| | | |
|---|---|---|
| WO | 200059116 A1 | 10/2000 |
| WO | 2006046334 A1 | 5/2006 |

OTHER PUBLICATIONS

Wu, Zheng et al "Dilation-Run Wavelet Image Coding", SIViP, 2008.

Sudhakar, R. et al "Image Compression using Coding of Wavelet Coefficients—A Survey", ICGST-GVIP Journal, vol. 5, Issue 6, Jun. 2005.

* cited by examiner

METHOD AND APPARATUS FOR FAST AND EFFICIENT IMAGE COMPRESSION AND DECOMPRESSION

CROSS-REFERENCE TO PRIOR APPLICATIONS

This application is the U.S. National Phase application under 35 U.S.C. § 371 of International Application No. PCT/EP2016/071262, filed on Sep. 9, 2016, which claims the benefit of European Patent Application No. 15185781.0, filed on Sep. 18, 2015. These applications are hereby incorporated by reference herein.

FIELD OF THE INVENTION

The present invention relates to data compression and decompression, in particular for large images as for example used in digital pathology.

BACKGROUND OF THE INVENTION

With the advancing development in digital image data processing more and more application fields have been opened up, each having field specific requirements to fulfill. In the field of digital pathology as an exemplary application field large amounts of data have to be handled to guarantee the necessary resolution for pathologic analysis. In order to cope with the large amounts of data, image data compression is usually indispensable. Conventionally, various techniques such as predictive encoding and encoding employing DCT (Discrete Cosine Transform) have been proposed, and are frequently used. In recent years, the information compressing method employing a wavelet transform has been vigorously studied and exploited, for instance in the JPEG2000 format.

The wavelet transform is based on a multi hierarchy subband division, in which a subband is divided in a horizontal direction, a vertical direction and a diagonal direction. Having a band divided up to the third hierarchy, then results in ten subbands as shown in FIG. 1. Herein, each of 3LL, 3LH, 3HL, and 3HH is a subband of least significant hierarchy, each of 2LH, 2HL, and 2HH is a subband of the next higher hierarchy, and each of 1LH, 1HL and 1HH is the subband of most significant hierarchy. Further, LH is a subband low-pass-filtered in a horizontal direction and high-pass-filtered in a vertical direction, HL is a subband high-pass-filtered in a horizontal direction and low-pass-filtered in a vertical direction, and HH is a subband high-pass-filtered in both of a horizontal direction and a vertical direction.

Compared with JPEG the JPEG2000 format exploiting wavelet transform encoding results in less peculiar distortion and noise that stems from a block structure. The wavelet transform itself has no compression effect; hence it is often used in combination with entropy encoding that enables compression of the sub-band coefficients. Data compression techniques generally handle a tradeoff between data quality and encoding speed.

JPEG for instance provides lower quality and cannot be made lossless in an easy manner. Advanced compression formats such as JPEG2000 on the other hand are rather slow, compared to JPEG. For applications such as—but not limited to—digital pathology real time image compression on off the shelve PCs is desirable in order to enable on the fly analysis by a user. JPEG2000 would require tailor made hardware compression codecs in order to enable such real time image compression.

SUMMARY OF THE INVENTION

It is an object of the present invention to provide an improved image compression allowing fast and efficient compression while providing for dynamic tradeoff between bandwidth use and image quality which is especially important for image communication over networks.

The objective is solved by the subject matter defined in the independent claims.

In a first aspect of the invention there is provided a method for encoding image data, the method comprising the steps of obtaining a digital image representation of the image data,
generating serialized bit-planes of the image representation; run-length encoding of 0 bit sequences in each bitplane by a zero run symbol and a value indicative of the run length; optimal prefix encoding of bits in each bitplane sharing local context, and of the zero run symbol to generate code words, wherein the local context is given by a predetermined number of neighboring bits;
storing the code words for each encoded bitplane sequentially.

The invention is based on the idea of serializing bitplanes representing a particular bit of a respective n-bit pixel representation, e.g. a bitplane for the most significant bit, followed by a bitplane of the next significant bit down to a bitplane of the least significant bit. The bits in each plane are then run-length and subsequently optimal prefix encoded. The resulting code words are then output in sequential order. A key aspect underlying the approach is speed and simplicity over compression ratio. The proposed coder is around 10% less efficient than a complex bitplane coder such as used in EBCOT for JPEG2000. On the other hand, it is 10 times faster. Also it is optimized to be implemented in an ASIC or an FPGA. Furthermore, by storing pointers to the respective first bits of each bitplane in the header of a respective image in the data stream, it is possible to progressively decompress the image, e.g. generating a lower quality image by not taking into account a predefined number of the least significant bitplanes. Such partial decompression of the image data leads to a lower quality image, but not a corrupted image which may suffice in certain situations, for instance for a quick review. Therefore, in a preferred embodiment the method comprises providing pointers to the first bit of each compressed bitplane in the bit stream in a header section of a respective image in the bit stream.

In a preferred embodiment an amount of bits used to store an amount of 0 bits in the 0 bit sequences is optimized for the respective dataset. For small zero runs this may result in no zero run being encoded, but just two ore more zeros. A large run may be split into multiple smaller runs, depending on the specific application and the number of occurrences, e.g. zero patterns.

In a preferred embodiment the local context comprises neighboring bits in an N-dimensional data set, e.g. a 2*2*2 bit locality in a 3D data set, such as a 3D transformed image.

In a preferred embodiment the predetermined number of neighboring bits are mapped to a byte symbol wherein the predetermined number of bits is an efficient unit of computing. If for instance the efficient unit of computing of a computer/chip is 8 bit, the amount of bits in a locality is set to 8 to have an efficient 8 bit=1 byte symbol table.

In a preferred embodiment the method further comprises masking a bitplane with only zero coefficients by providing respective information in a header section of a resulting bitstream.

In a preferred embodiment, obtaining a digital image representation comprises transform coding of the image data to generate an image representation by transform coefficients. Transform coding may comprise any transformation that leads to neighboring pixels that are correlated (e.g. wavelets, edgelets, brushlets, cosine packets, etc.)

In a preferred embodiment the transform coding is wavelet transform coding. The coefficients received from wavelet transform coding may or may not be quantized.

In another aspect of the invention there is provided an apparatus for encoding image data, wherein the apparatus is adapted to obtain a digital image representation of the image data, generate serialized bit-planes of the image representation;

run-length encode 0 bit sequences in each bitplane by a zero run symbol and a value indicative of the run length;

optimal prefix encode bits in each bitplane sharing local context, and of the zero run symbol to generate code words, wherein the local context is given by a predetermined number of neighboring bits;

outputting the code words for each encoded bitplane sequentially.

In a further aspect there is provided a method for decoding comprising:

obtaining pointers to a first bit of each of a plurality of compressed bitplanes belonging to a respective image in a bit stream from a header section of the bit stream; wherein each bitplane comprises 0 run length and prefix encoded data representative of a particular bit of an initial n-bit value representative of a pixel value, in dependence of a desired image quality, decode a predetermined number of bitplanes by applying prefix decoding and run length decoding to those bitplanes required to obtain the desired quality using the pointers comprised in the header section. For a lower quality image, which may be sufficient for a first quick review, the 3 least significant bitplanes may be discarded from image decoding such that the resulting image may be provided faster compared to a full reconstruction.

In a further aspect of the invention there is provided a computer program executable in a processing unit, the computer program comprising program code means for causing the processing unit to carry out a method as defined in the methods according to the above aspects of the invention when the computer program is executed in the processing unit.

It shall be understood that the method for encoding image data of claim 1, the method for decoding of claim 8 and the non-transitory computer readable medium of claim 9 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
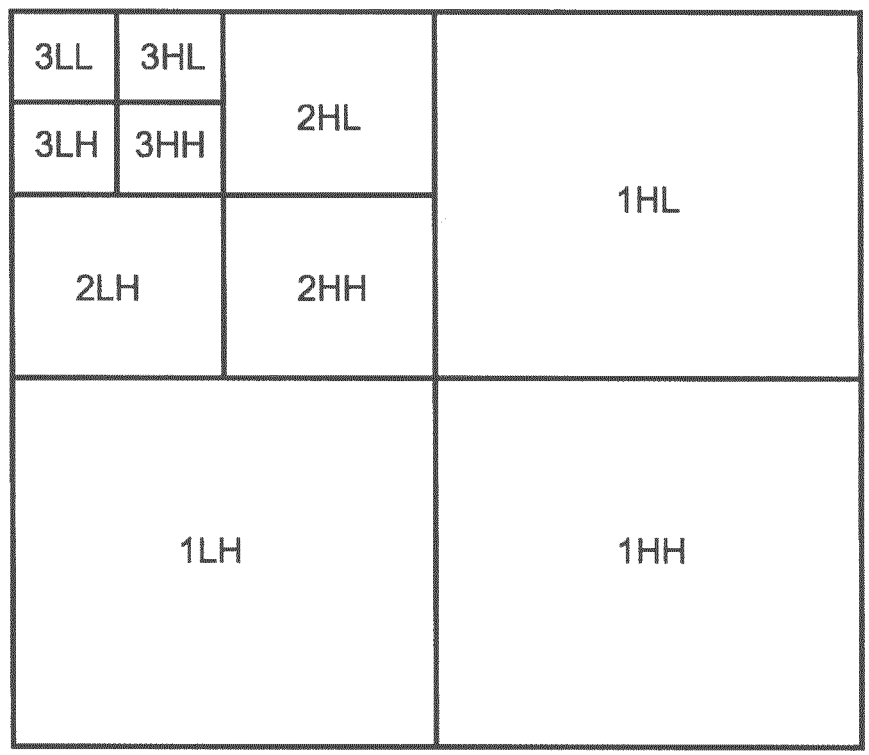
FIG. 1 illustrates the wavelet encoding principle
Figure 2:
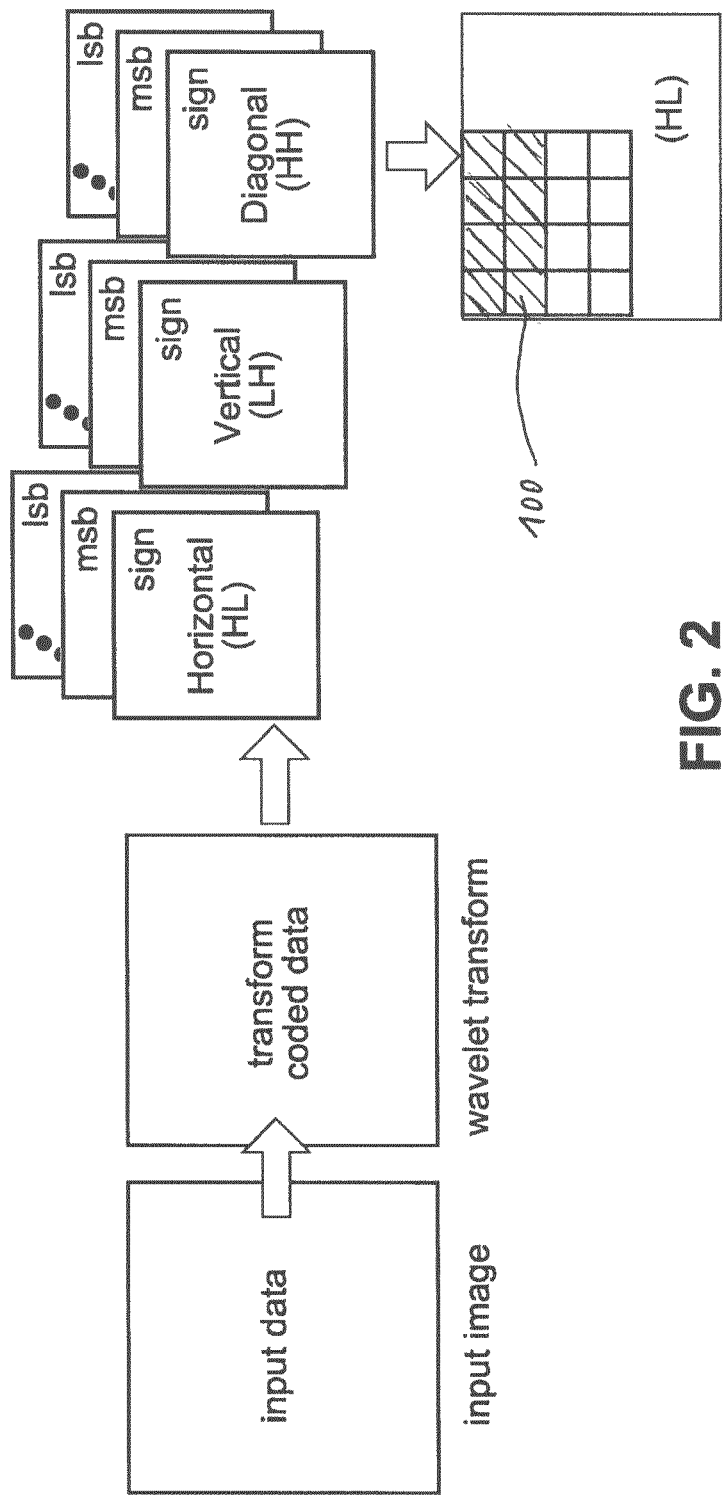
FIG. 2 shows a preferred embodiment of the present invention.

FIG. 2 shows an embodiment of the present invention. Wherein the embodiment is described with respect to compression of wavelet transform coefficients it shall be understood that any other transform coding typically applied in the field of image encoding, e.g. Discrete Cosine Transform (DCT) may be used instead.

The method would even work on non-transform coded image data. Using a wavelet transform the serialization would result in three sets of subbands: HL is a subband high-pass-filtered in a horizontal direction and low-pass-filtered in a vertical direction, LH is a subband low-pass-filtered in a horizontal direction and high-pass-filtered in a vertical direction, and HH is a subband high-pass-filtered in both of a horizontal direction and a vertical direction.

The coefficients received after transform coding are bit-plane-serialized. That is, instead of storing the pixels (in this case represented by transform coefficients) as sequential numbers, the coefficients are stored as bitplanes, where each bitplane is a set of bits corresponding to a given bit position in each of the binary numbers representing a pixel signal. For example, for an 8-bit data representation there are 8 bitplanes. The first bitplane may contain the set of most significant bits (msb), followed by the second bitplane containing the next lower significant bit and so on until the 8th bitplane contains the least significant bit (lsb). In such a representation the first bitplane usually gives the roughest but the most critical approximation of values of a medium. The higher the number of the bitplane, the less is its contribution to the final stage. Thus, adding a bitplane gives a better approximation.

Instead of using a complicated bitplane coder such as EBCOT from JPEG2000, a very simple optimal prefix coder, e.g. a Huffman coder, is used for a local context of the bitplane, e.g. as in this example a 4*2 bit neighborhood (this is illustrated in FIG. 2 by reference 100 pointing to a set of dashed pixels). Having bits sharing a local context can efficiently compress patterns with non randomness in the data.

For instance, the bitplanes can be analyzed for 0 runs, which can be run length encoded by replacing a respective 0 bit sequence by a zero run symbol followed by a number indicating the run length. Preferably, the zero run encoding acts on groups of bits that are zero, having the same local context as the non zero bits (e.g. 4×2 bits). The zero run symbol and all other bits in the bitplane sharing locality are then optimal prefix coded. Thus, the local context of the remaining (non-zero) bits is not destroyed by the zero run length encoding.

Wherein the optimal prefix coder is not very efficient for large patches of bits that are 0, which occur frequently in wavelet coefficients, additionally using a 0 only run length coder (counting number of sequential zeros, and storing them) significantly improves the compression ratio.

In a further step the compressed coefficients (optimal prefix+0 run length coded) may be stored per bitplane in the order of significance. This means in a first bitplane the sign will be stored, in the next plane the most significant bit, down to in the last plane the least significant bit. By storing a corresponding seektable in the header to each compressed bitplane, it is possible to progressively decompress the image. Fast generation of a lower quality image is enabled by not taking into account an arbitrary number of the least significant bitplanes.

Figure 3:
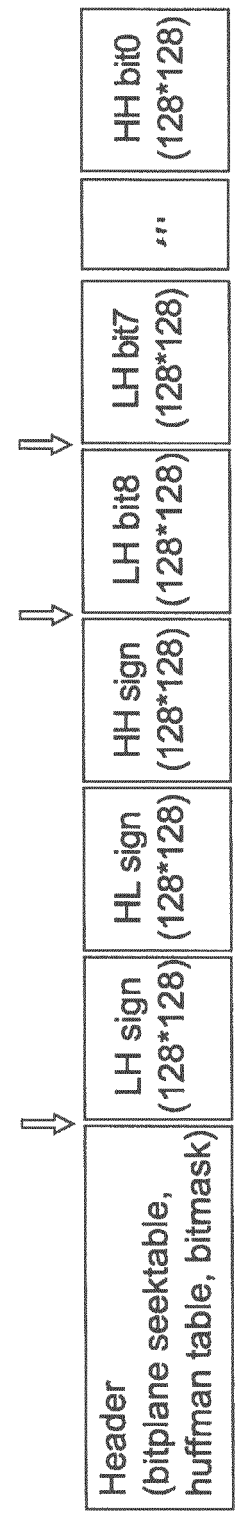
FIG. 3 shows an exemplary image block of a data stream in accordance with a preferred embodiment of the present invention.

FIG. 3 shows the image block sequence in accordance with a preferred embodiment of the present invention. In a header section there is provided information relating to the bitplane, the seektable and the entropy coder (e.g. Huffman table) and optionally a bit mask in case an entire bitplane has only zero entries. For each of the three subbands resulting from wavelet coding LH, HL and HH follows the first bitplane relating to the sign of the n-bit coefficient representation, then the bitplanes for the most significant bits follow, here bit 8, followed by bit 7 for all subbands, down to bit 0.

The invention claimed is:

1. A method for encoding image data, the method comprising:
    obtaining a digital image representation of the image data, generating serialized bit-planes of the image representation;
    run-length encoding of 0 bit sequences in each bitplane by a zero run symbol and a value indicative of the run length;
    using a Huffman encoder to encode bits in each bitplane sharing local context and of the zero run symbol to generate code words, wherein the local context is given by a predetermined number of neighboring bits and the predetermined number of neighboring bits are mapped to a byte symbol; and
    outputting the code words for each encoded bitplane sequentially.

2. The method of claim 1, further comprising:
    providing pointers to a first bit of each compressed bitplane in a bit stream in a header section of a respective image in the bit stream.

3. The method of claim 1, wherein one or a combination of an amount of bits used to store an amount of 0 bits in the 0 bit sequences is chosen based on an evaluation of a zero bit pattern for the respective dataset or wherein the local context comprises neighboring bits in an N-dimensional data set.

4. The method of claim 1, wherein the predetermined number of neighboring bits is a multiple of 8 bits.

5. The method of claim 1, further comprising masking a bitplane with only zero bit entries by providing respective information in a header section of a resulting bitstream.

6. The method of claim 1, wherein obtaining a digital image representation comprises transform coding of the image data to generate an image representation by transform coefficients.

7. The method of claim 6, wherein one or a combination of the transform coding is wavelet transform coding or wherein the coefficients received from wavelet transform coding are quantized.

8. A method for decoding image data, the method comprising:
    obtaining pointers to a first bit of each of a plurality of compressed bitplanes belonging to a respective image in a bit stream from a header section of the bit stream, wherein each bitplane comprises 0 run length and prefix encoded data representative of a particular bit of an initial n-bit value representative of a pixel value; and
    decoding a predetermined number of bitplanes by applying prefix decoding and run length decoding to those bitplanes defined by the predetermined number using the pointers comprised in the header section, wherein the bit planes are decoded in descending order from most significant bit to least significant bit wherein the predetermined number is less than or equal to a number of compressed bitplanes.

9. A non-transitory computer-readable medium having instructions stored thereon that are executable in a processing unit, the instructions when executed cause the processing unit to carry out the method defined in claim 8.

\* \* \* \* \*